(12) United States Patent
Atsuta et al.

(10) Patent No.: US 7,332,708 B2
(45) Date of Patent: Feb. 19, 2008

(54) OPTICAL ENCODER

(75) Inventors: Akio Atsuta, Kanagawa (JP);
Masahiko Igaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/696,075

(22) Filed: Apr. 3, 2007

(65) Prior Publication Data

US 2007/0181791 A1    Aug. 9, 2007

Related U.S. Application Data

(63) Continuation of application No. 10/783,592, filed on Feb. 20, 2004, now Pat. No. 7,217,916.

(30) Foreign Application Priority Data

Mar. 5, 2003    (JP) .............................. 2003-058028

(51) Int. Cl.
*G01D 5/34* (2006.01)
(52) U.S. Cl. ................................................. 250/231.13
(58) Field of Classification Search ........... 250/231.13, 250/231.14
See application file for complete search history.

(56) References Cited

U.S. PATENT DOCUMENTS

| | | | |
|---|---|---|---|
| 5,750,983 | A | 5/1998 | Swanson |
| 6,093,928 | A | 7/2000 | Ohtomo et al. |
| 6,201,605 | B1 * | 3/2001 | Shiga .......................... 356/394 |
| 6,410,910 | B1 | 6/2002 | Feichtinger |
| 2002/0000514 | A1 | 1/2002 | Haas et al. |
| 2002/0014581 | A1 | 2/2002 | Yamamoto et al. |
| 2003/0218125 | A1 | 11/2003 | Igaki et al. |
| 2006/0038803 | A1 * | 2/2006 | Miller et al. ................. 345/204 |

* cited by examiner

*Primary Examiner*—Georgia Epps
*Assistant Examiner*—Kevin Wyatt
(74) *Attorney, Agent, or Firm*—Canon USA Inc IP Division

(57) ABSTRACT

In an optical encoder, a plurality of light sources is controlled on and off so as to use light rays to irradiate an optical grating of a scale from a plurality of different directions. The light rays are received by a plurality of photoreceptor elements. Operations are performed using signals output from the photoreceptor elements. Accordingly, the relative position between the photoreceptor elements and the scale is detected precisely.

5 Claims, 11 Drawing Sheets

OPTICAL ENCODER

CROSS-REFERENCE TO RELATED APPLICATIONS

The present application is a continuation of U.S. patent application Ser. No. 10/783,592, filed Feb. 20, 2004, now U.S. Pat. No. 7,217,916 entitled "OPTICAL ENCODER", the content of which is expressly incorporated by reference herein in its entirety. Further, the present application claims priority from Japanese Patent Application No. 2003-058028, filed Mar. 5, 2003, which is also hereby incorporated by reference herein in its entirety.

BACKGROUND OF THE INVENTION

1. Field of the Invention

The present invention generally relates to optical encoders. Particularly, the present invention relates to optical encoders with enhanced resolution for measuring angles and displacements.

2. Description of the Related Art

An optical encoder includes a main scale having a first optical grating, and an index scale having a second optical grating. Disposed opposite the main scale is a light source for irradiating the main scale with light, and a photoreceptor element that receives light via the optical grating of the main scale and the optical grating of the index scale. A photoreceptor element array that also functions as an index scale has been used in this type of optical encoder.

Figure 9:
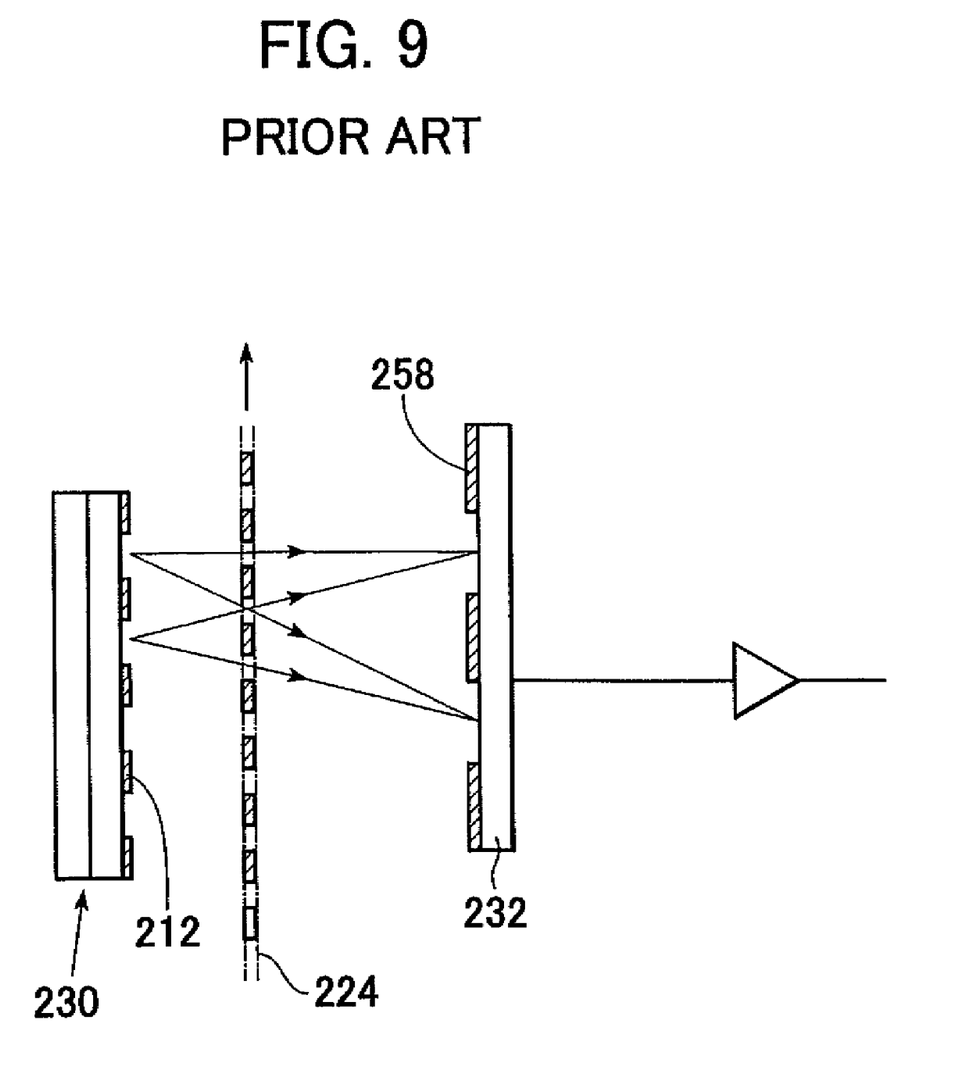
FIG. 9 is a diagram showing the construction of a conventional optical encoder.
Figure 10:
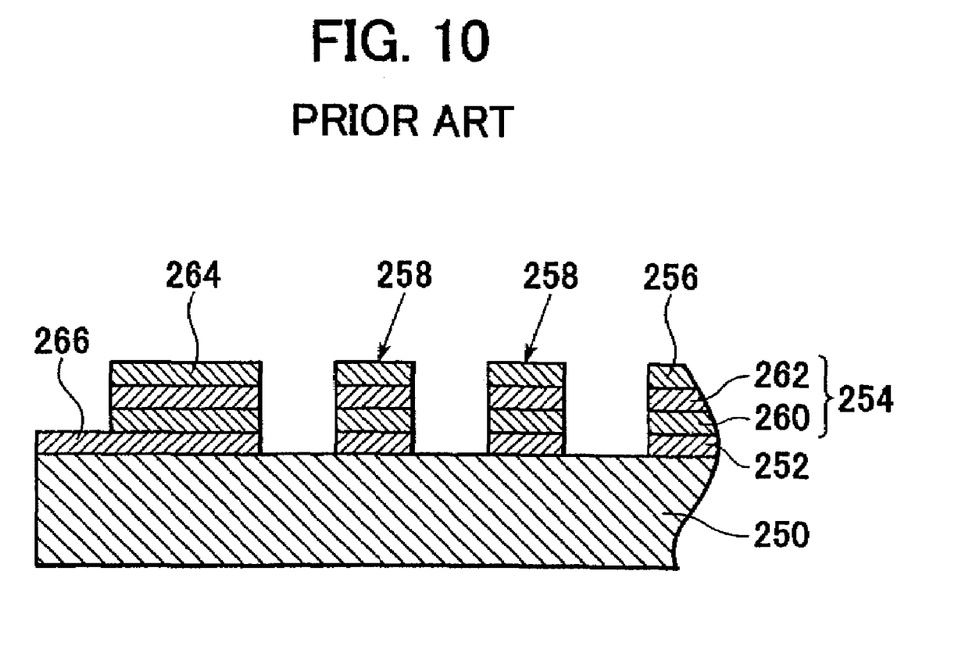
FIG. 10 is a sectional view of a detecting-side grating substrate.

FIG. 9 is a schematic diagram showing the construction of a conventional photoelectric encoder. As shown in FIG. 9, a detecting-side grating substrate 232 includes photoreceptor elements 258 disposed at a regular pitch. As shown in FIG. 10, each of the photoreceptor elements 258 includes a first signal lead-out layer 252 composed of a light-blocking, conductive material such as a metal film, a PN semiconductor layer 254 that converts light into an electric signal, and a second signal lead-out layer 256 composed of a light-transmitting, conductive material such as $In_2O_3$, $SnO_2$, Si, or a mixture thereof, laminated in that order on a light-transmitting base 250 composed of, for example, glass. The photoreceptor elements 258 are disposed opposite a main scale 224, and the photoreceptor elements 258 form slits.

Light reaches the PN semiconductor layer 254 via the second signal lead-out layers 256 of the photoreceptor elements 258, and is photoelectrically converted at the boundary between an N-type amorphous silicon film 260 and a P-type amorphous silicon film 262. The resulting signals are extracted to the outside from output terminals 264 and 266.

In this type of optical encoder, a light-emitting-side grating substrate 230 is formed integrally with light-emitting elements 212, and the detecting-side grating substrate 232 is formed integrally with the photoreceptor elements 258, serving to reduce the number of parts and to reduce size and weight.

Figure 11:
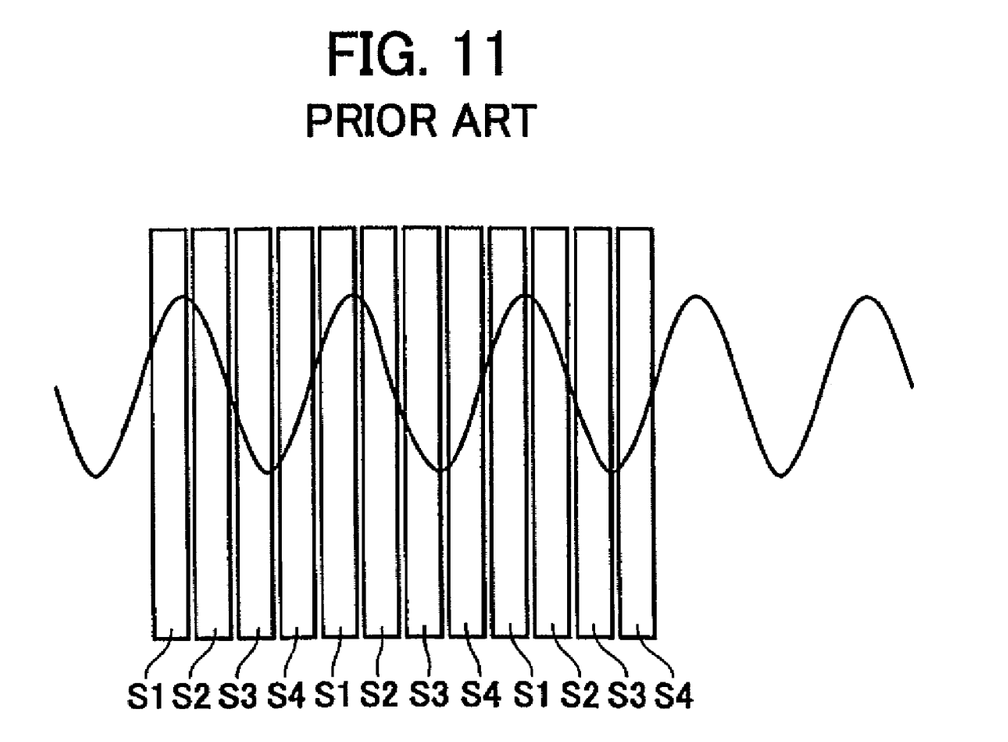
FIG. 11 is a diagram showing the relationship between an example of a pattern of a photodiode array and a bright and dark pattern of detected light.

FIG. 11 shows the relationship between an example of a pattern of photoreceptor photodiodes in the encoder and a pattern of detected bright and dark light. Photodiodes S1 to S4 are repeatedly subject to signal phase shifts of 0°, 90°, 180°, and 270° with respect to a bright and dark pattern of light represented by a sine wave. Signals generated by the photodiodes S1 to S4 are input to a current-voltage converter circuit (not shown). Then the signals from the current-voltage conversion are shifted by 90° with respect to each other. By differential amplification, analog sine-wave voltage signals of two phases are obtained. For example, phase A (S1-S3) and phase (S2-S4) having phases of 0° and 90°, are obtained.

Actually in the encoder, the analog sine-wave voltage signals are input into a comparator, and the resulting digital signals are fed into a counter circuit or the like.

In a conventional encoder, in order to further enhance resolution, the pitch of the scale and the bright and dark regions of the photoreceptor elements must be further reduced.

However, when the scale pitch is reduced, a considerable decrease in precision occurs. This is because the amplitudes of signals obtained by the photoreceptor elements become smaller, causing noise or affecting the hysteresis of the comparator used for digitization, resulting in a considerable decrease in precision.

SUMMARY OF THE INVENTION

It is an object of the present invention to overcome one or more of the problems described above, and to provide an optical encoder in which the resolution is enhanced without reducing the scale pitch or the photoreceptor element pitch.

Accordingly, in one aspect, the present invention provides an optical encoder including a scale having an optical grating; a plurality of photoreceptor elements that are movable with respect to the scale and that are disposed in relation to a pitch of the optical grating; light source means having at least two light sources for irradiating the photoreceptor elements through the scale with light rays from at least two different directions; and control means for switching light-emitting status of the at least two light sources; wherein the control means obtains relative-position information of the scale and the photoreceptor elements by processing information obtained from the light-emitting status of the light sources when the light-emitting status of the light sources is switched.

According to another aspect of the present invention, an optical encoder with enhanced resolution is provided. The optical encoder includes a scale having an optical grating and a plurality of movable photoreceptor elements. Note that each movable photoreceptor element is positioned based on a pitch of the optical grating. The optical encoder further includes first and second light sources for providing light to the photoreceptor elements such that light is provided in a first direction by the first light source and in a second direction by the second light source.

Also included in the optical encoder is a switch for controlling the light-emitting status of the first light source and the second light source. This switch is capable of using the light emitting status of the first and the second light sources to acquire relative-position information of the scale and the photoreceptor elements.

Further objects, features and advantages of the present invention will become apparent from the following description of the preferred embodiments (with reference to the attached drawings).

BRIEF DESCRIPTION OF THE DRAWINGS

FIG. 3 is a diagram showing the relationships between scale positions and signals in cases where the respective light-emitting elements are turned on.

FIG. 6 is a diagram showing the relationships between scale positions and signals in cases where the respective light-emitting elements are turned on.

DESCRIPTION OF THE PREFERRED EMBODIMENTS

Now, preferred embodiments of the present invention will be described in detail with reference to FIGS. 1 to 8.

Figure 1:
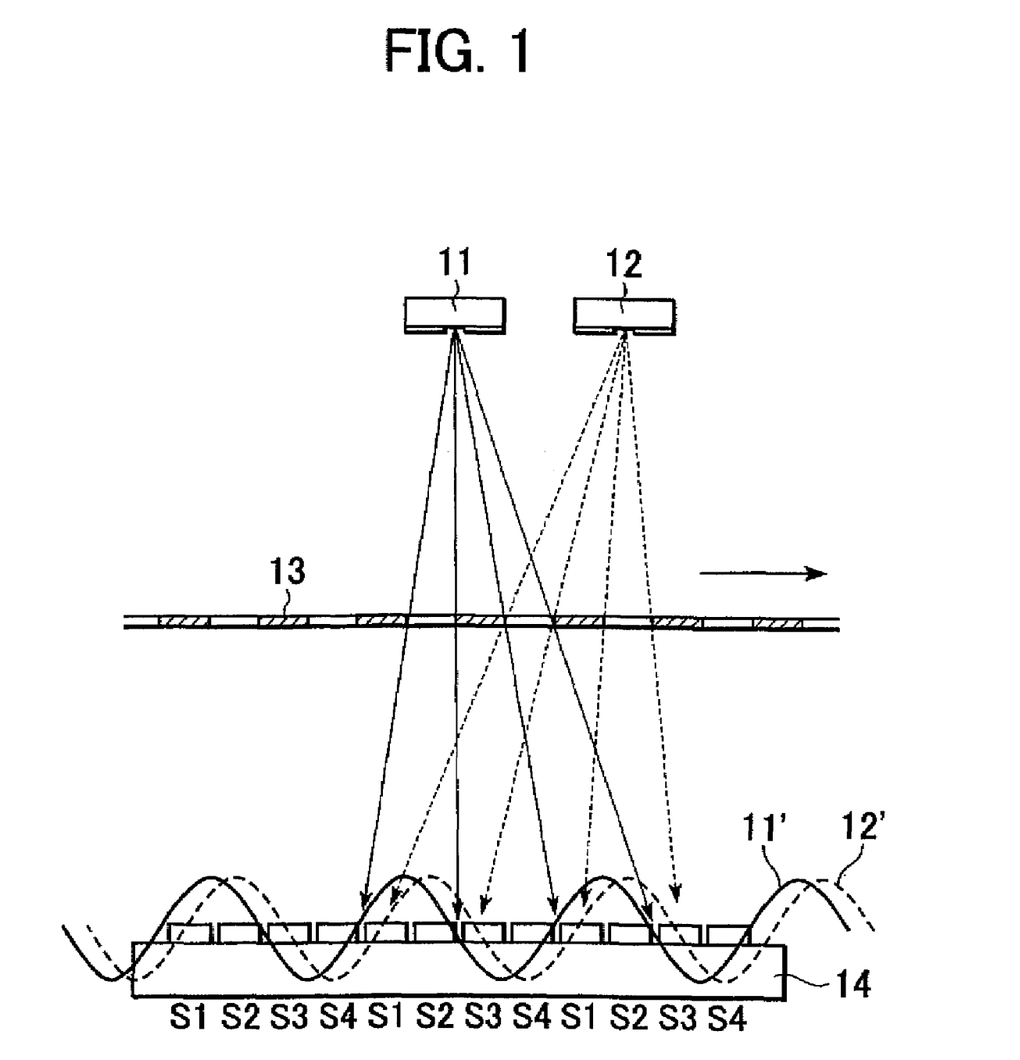
FIG. 1 is a diagram showing the construction of an optical encoder according to a first embodiment of the present invention.

FIG. 1 is a diagram showing the construction of an optical encoder according to a first embodiment. In FIG. 1, the optical encoder includes two light-emitting elements 11 and 12 disposed in parallel to each other. The optical encoder also includes both an encoder scale having an optical grating and having a movable member at a middle part, and a photoreceptor 14 having photodiodes S1 to S4 on a surface thereof, disposed opposing the light-emitting elements 11 and 12 across the encoder scale 13.

Figure 2:
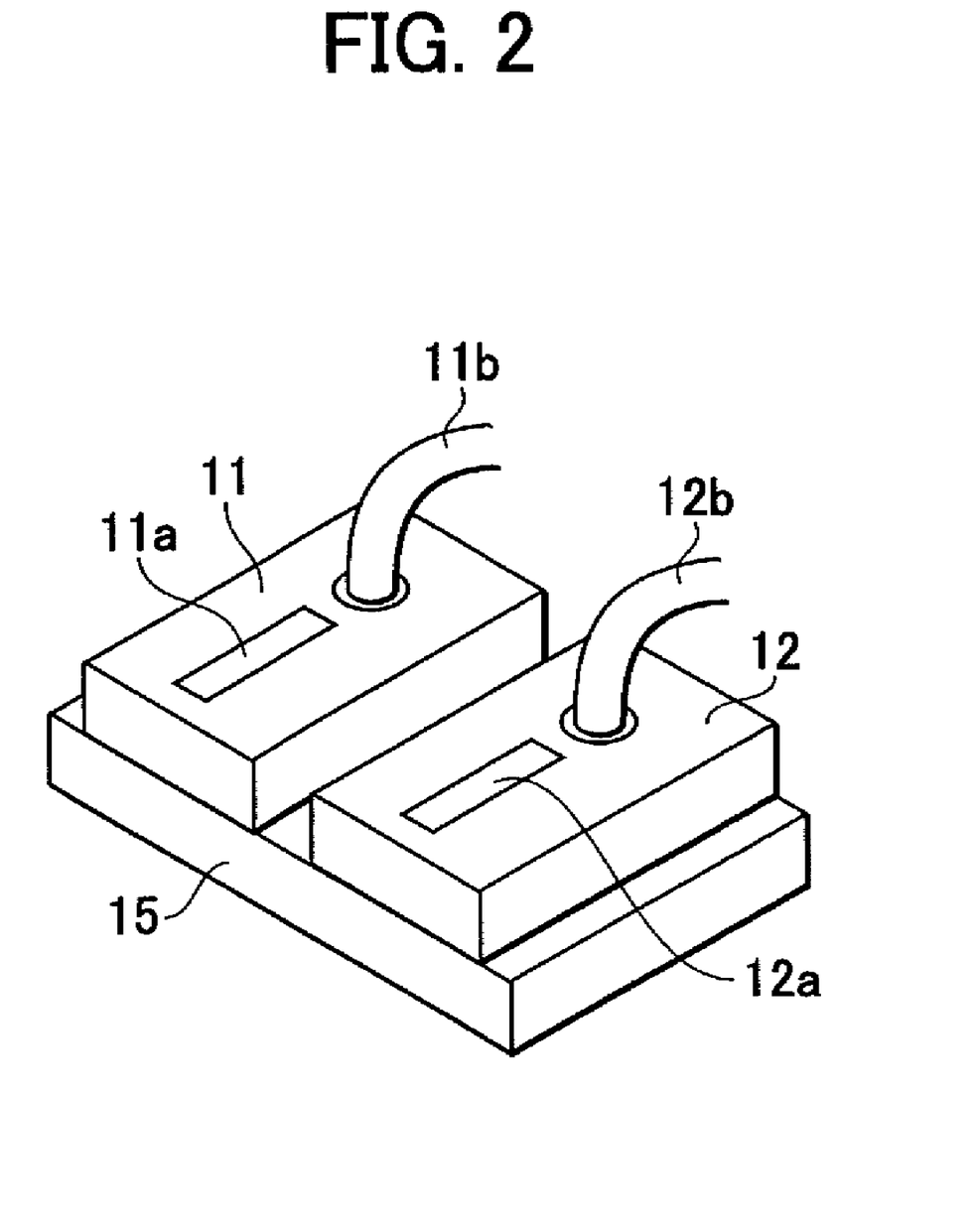
FIG. 2 is a perspective view of light-emitting elements.

As shown in FIG. 2, the light-emitting elements 11 and 12 have light-emitting windows 11a and 12a, receive voltages through wires 11b and 12b, respectively, and also receives a common voltage through a common electrode 15. One advantage of the present invention is that at least two light-emitting windows 11a and 12a are provided so that light-emitting states are controlled independently of each other. In contrast, in the related art, windows are provided for light-emitting elements and lights are emitted simultaneously at multiple points.

The light-emitting elements 11 and 12 are positioned such that lights received on the photoreceptor 14 are mutually shifted in position by 45°. Thus, the intensity of light received on the photoreceptor 14 when the light-emitting element 11 is turned on is as indicated by 11' in FIG. 1, and the intensity of light received on the photoreceptor 14 when the light-emitting element 12 is turned on is as indicated by 12'.

Figure 3:
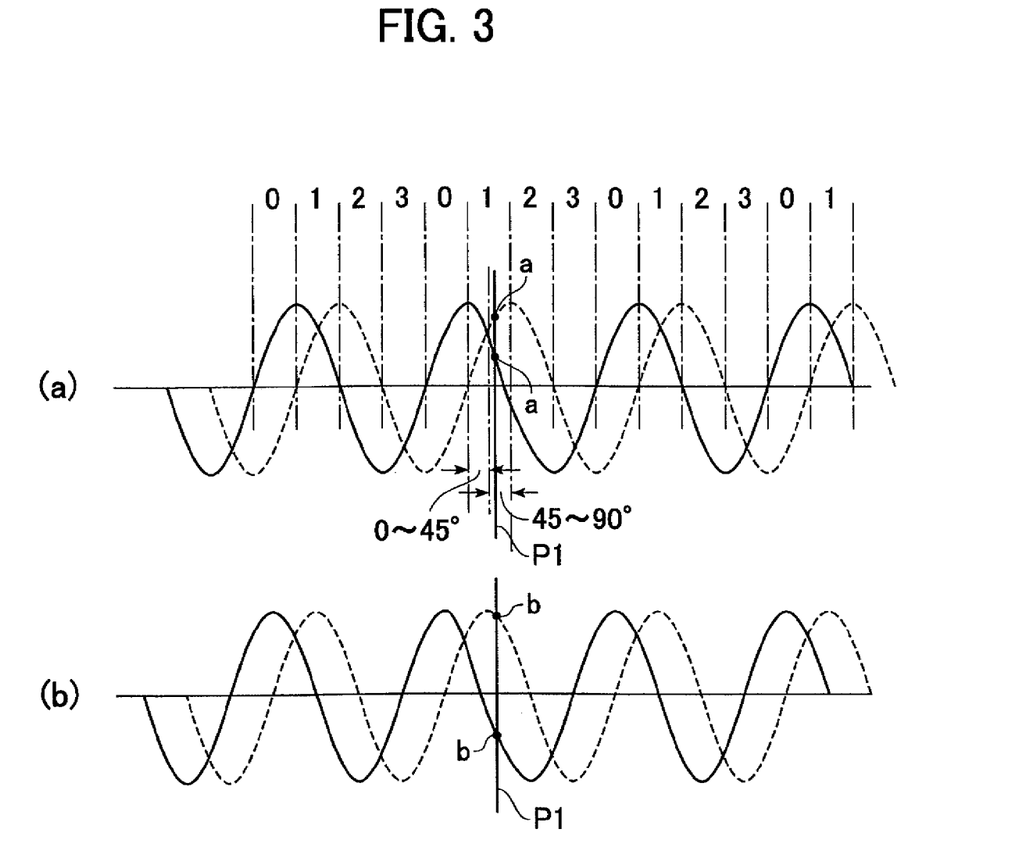

FIG. 3 is a diagram showing the relationships between positions of the encoder scale 13 and signal outputs in cases where the light emitting elements 11 and 12 are turned on, respectively. In FIG. 3, part (a) also shows the relationship between an analog waveform and digitally counted values obtained by multiplying one cycle of the analog waveform by four.

When the encoder scale 13 attached to the movable member is moved, a pattern of bright and dark regions moves over the photoreceptor 14. On the photoreceptor 14, a set of photodiodes S1 to S4 is arranged so as to divide each cycle of the bright and dark pattern by four, and by processing the divided parts of the bright and dark pattern, two-phase signals including phase-A signals (S1-S3) and phase-B signals (S1-S3) are output.

For the light distribution of the state 11' with the light-emitting element 11 turned on, signal values shown in part (a) of FIG. 3 are output from processing circuits for phase A and phase B. On the other hand, for the light distribution of the state 12' with the light-emitting element 12 turned on, signal values shown in part (b) of FIG. 3 are output from the processing circuits for phase A and phase B.

When the bright and dark pattern moves over the photoreceptor 14, the light-emitting element 11, which is temporally shifted by 90° in phase, is turned on, and signals of phase A and phase B by the encoder scale 13 are obtained. Thus, the amount of movement can be detected by counting the number of wave cycles of phase A and phase B. When the encoder scale 13 is at a halt at a certain point P1, signal levels take two points a in part (a) of FIG. 3.

When the light-emitting element 11 is turned off and the light-emitting element 12 is turned on, the positional relationship between the light-emitting elements 11 and 12 and the encoder scale 13 changes as shown in part (b) of FIG. 3. Thus, the relationship between positions and signals also changes; more specifically, the signals at points a in part (a) of FIG. 3 change to points b in part (b) of FIG. 3. This is equivalent to moving the encoder scale 13 by 45° in the arrow direction.

With regard to signals output from the signal processing circuits, when the light-emitting element 11 is on, points a are High for both phase A and phase B. On the other hand, when the light-emitting element 12 is on, points b are Low for phase A and High for phase B. The switching for phase B indicates that when the encoder 13 actually stops moving after further moving by 45°, the signal for phase A switches. That is, phase A and phase B reside in a 45° to 90° region within the 90° region at High level, so that the resolution becomes twice as high.

If the signal for phase A remains high, phase A and phase B exist within a 0° to 45° range in the above 90° region at high level.

Table 1 below shows the relationship between counter values, and digital signal level changes after switching of light-emitting elements, and position.

TABLE 1

| Counter value | Change in digital signal | Position in one cycle |
|---|---|---|
| 0 | No change | 0°–45° |
| 0 | Change | 45°–90° |
| 1 | No change | 90°–135° |
| 1 | Change | 135°–180° |
| 2 | No change | 180°–225° |
| 2 | Change | 225°–270° |
| 3 | No change | 270°–315° |
| 3 | Change | 315°–360° |

By switching between the light-emitting elements 11 and 12 as described above, the present invention can double the resolution of conventional art systems by reflecting a result obtained to another bit of counter value.

Figure 4:
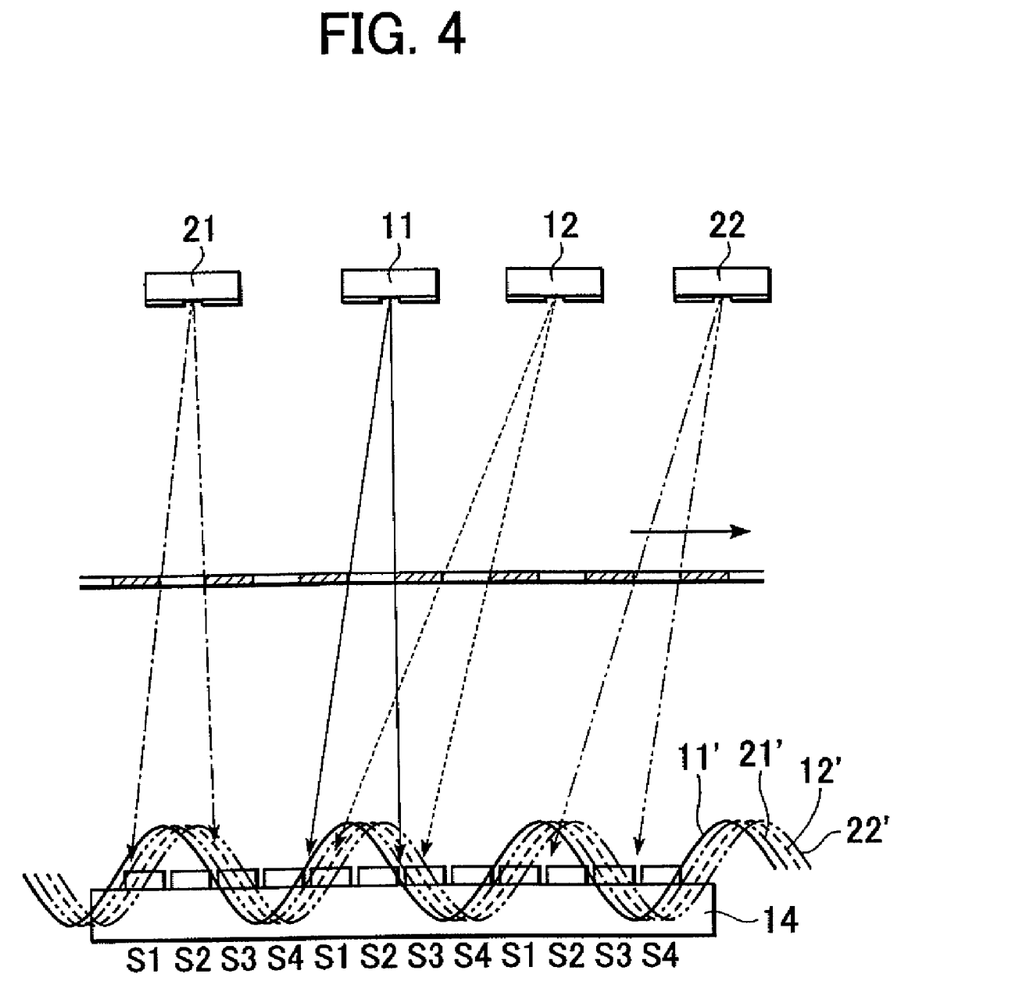
FIG. 4 is a diagram showing the construction of an optical encoder according to a second embodiment of the present invention.

FIG. 4 is a diagram showing the construction of an optical encoder according to a second embodiment. In the first embodiment, the two light-emitting elements 11 and 12 are provided and switched to achieve a resolution that is twice as high compared with the related art. In the second embodiment, light-emitting elements 21 and 22 are further arranged on both sides of the light-emitting elements 11 and 12 to achieve a resolution that is four times as high compared with the related art.

In FIG. 4, lines 11', 12', 21', and 22' represent the intensities of lights received on the photoreceptor 14 when the light-emitting elements 11, 12, 21, and 22 are turned on, respectively. The light-emitting elements 11, 21, 12, and 22 are positioned such that lights received thereby on the photoreceptor 14 are shifted in position by 22.5°.

Figure 5:
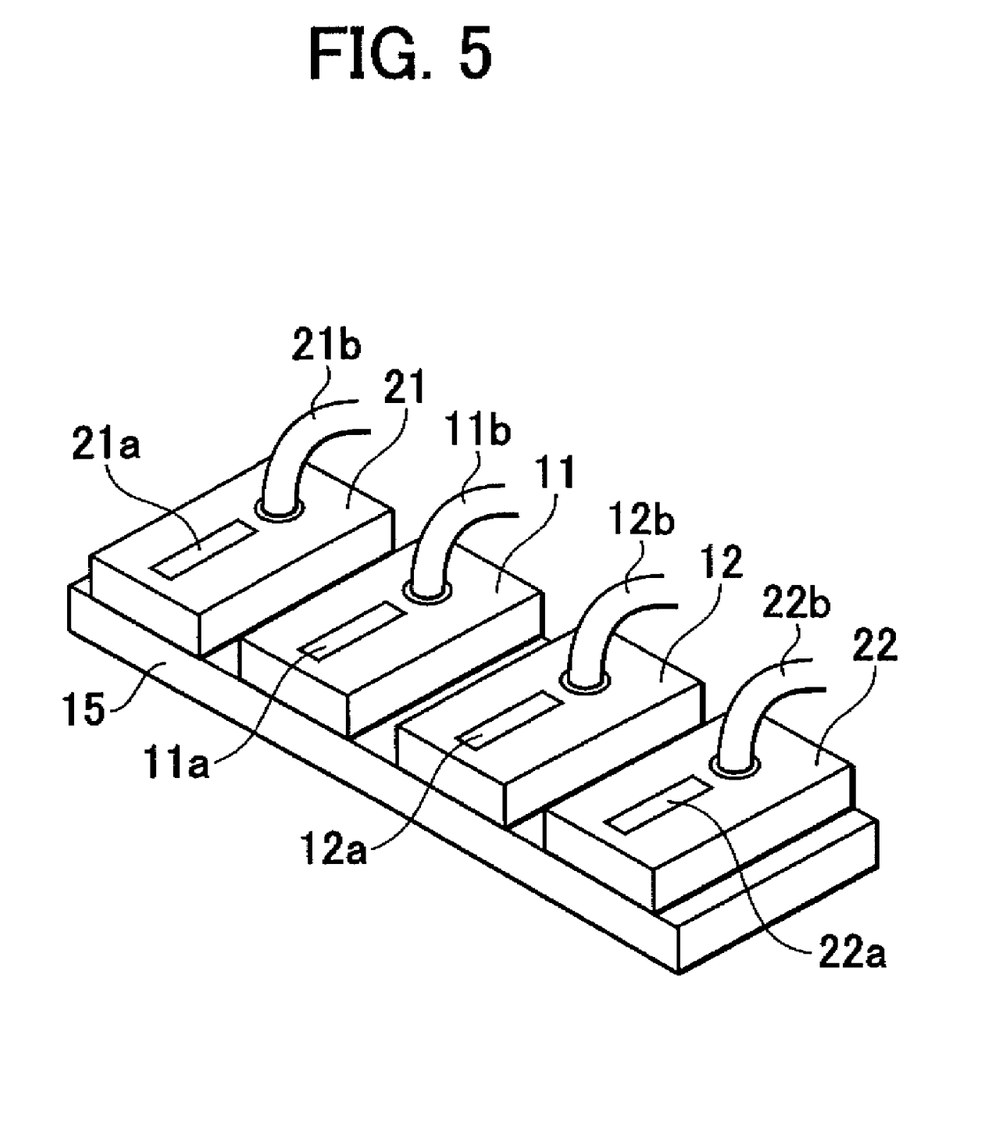
FIG. 5 is a perspective view of light-emitting elements.

FIG. 5 is a perspective view of the light-emitting elements in the second embodiment. The light-emitting elements 11, 12, 21, and 22 have light-emitting windows 11a, 12a, 21a, and 22a, and are connected to wires 11b, 12b, 21b, and 22b for supplying voltages, respectively.

Figure 6:
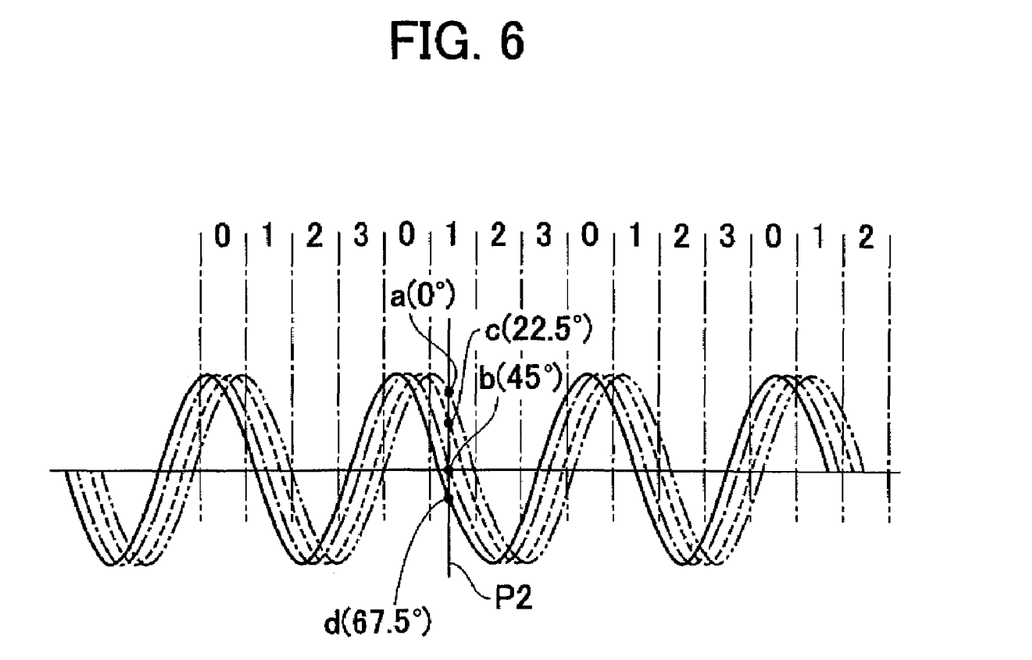

FIG. 6 shows the relationship between the positions of the encoder scale 13 and phase-A signals in cases where the light-emitting elements 11, 12, 21, and 22 are turned on. When the light-emitting element 11 is on, and when the encoder scale 13 stops at a certain point P2, signal a is obtained as a phase-A voltage. At this time, the voltage is at High level. Then, the light-emitting element 21 is turned on, whereby a signal c is obtained. Furthermore, as the light-emitting elements are switched to turn on the light-emitting elements 12 and 22 sequentially, the voltage changes to Low level when the light-emitting element 22 is switched on. The state where the light-emitting element 22 is on corresponds to the state where the encoder scale 13 is moved by 67.5°. That is, a point at which signal level changes correspond to a movement of the encoder scale by 67.5°. Thus, it is understood that P2 is in a range of 22.5° to 45° of the region of the counter value 1.

Table 2 summarizes similar relationships.

TABLE 2

| Counter value | Change in digital signal after switching of light-emitting elements | | | | Position in one cycle |
|---|---|---|---|---|---|
| | 11→21 | 21→12 | 12→22 | 22→11 | |
| 0 | No change | No change | No change | No change | 0°-22.5° |
| 0 | No change | No change | Change | No change | 22.5°-45° |
| 0 | No change | Change | No change | No change | 45°-67.5° |
| 0 | Change | No change | No change | No change | 67.5°-90° |
| 1 | No change | No change | No change | No change | 90°-112.5° |
| 1 | No change | No change | Change | No change | 112.5°-135° |
| 1 | No change | Change | No change | No change | 135°-157.5° |
| 1 | Change | No change | No change | No change | 157.5°-180° |
| 2 | No change | No change | No change | No change | 180°-202.5° |
| 2 | No change | No change | Change | No change | 202.5°-225° |
| 2 | No change | Change | No change | No change | 225°-247.5° |
| 2 | Change | No change | No change | No change | 247.5°-270° |
| 3 | No change | No change | No change | No change | 270°-292.5° |
| 3 | No change | No change | Change | No change | 292.5°-315° |
| 3 | No change | Change | No change | No change | 315°-337.5° |
| 3 | Change | No change | No change | No change | 37.5°-360° |

Thus, according to this embodiment, one cycle of waveform can be divided by 16.

Figure 7:
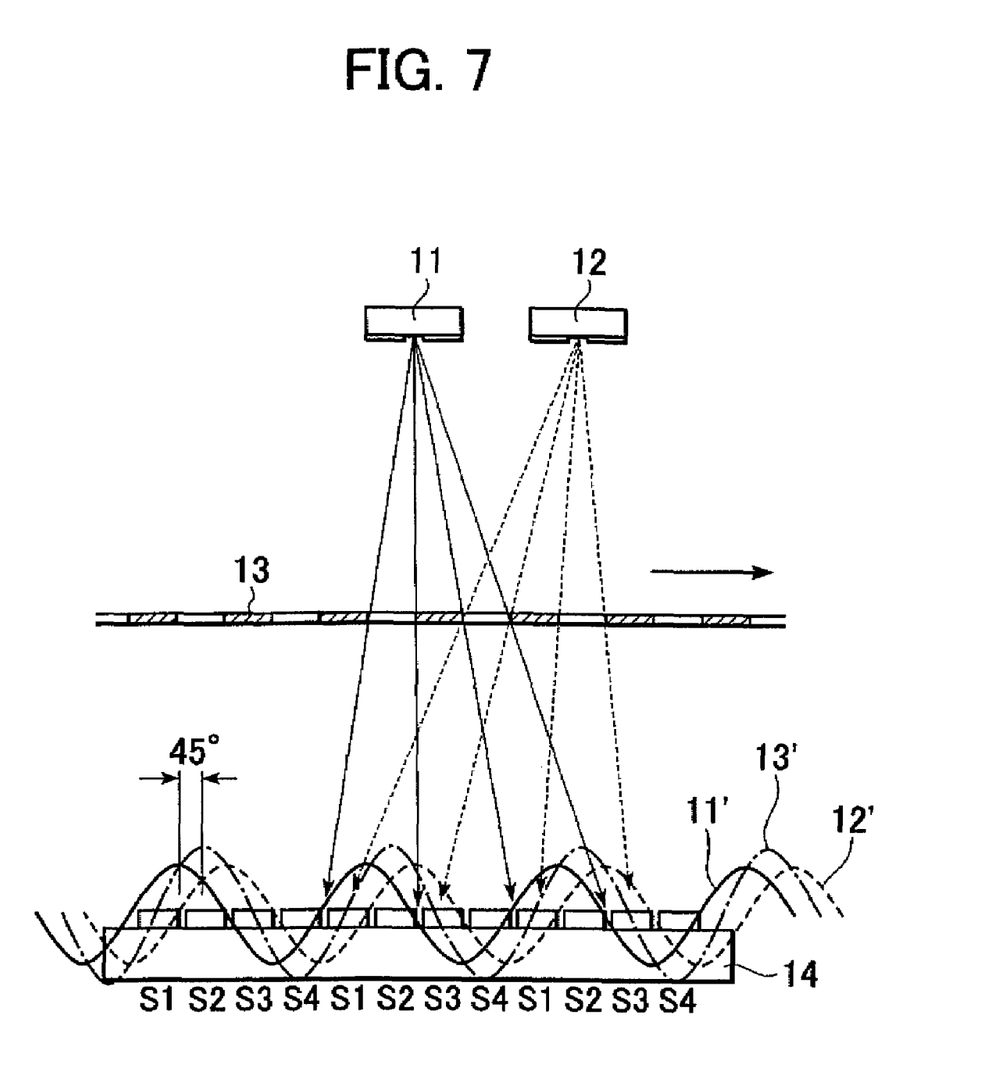
FIG. 7 is a diagram showing the construction of an optical encoder according to a third embodiment of the present invention.
Figure 8:
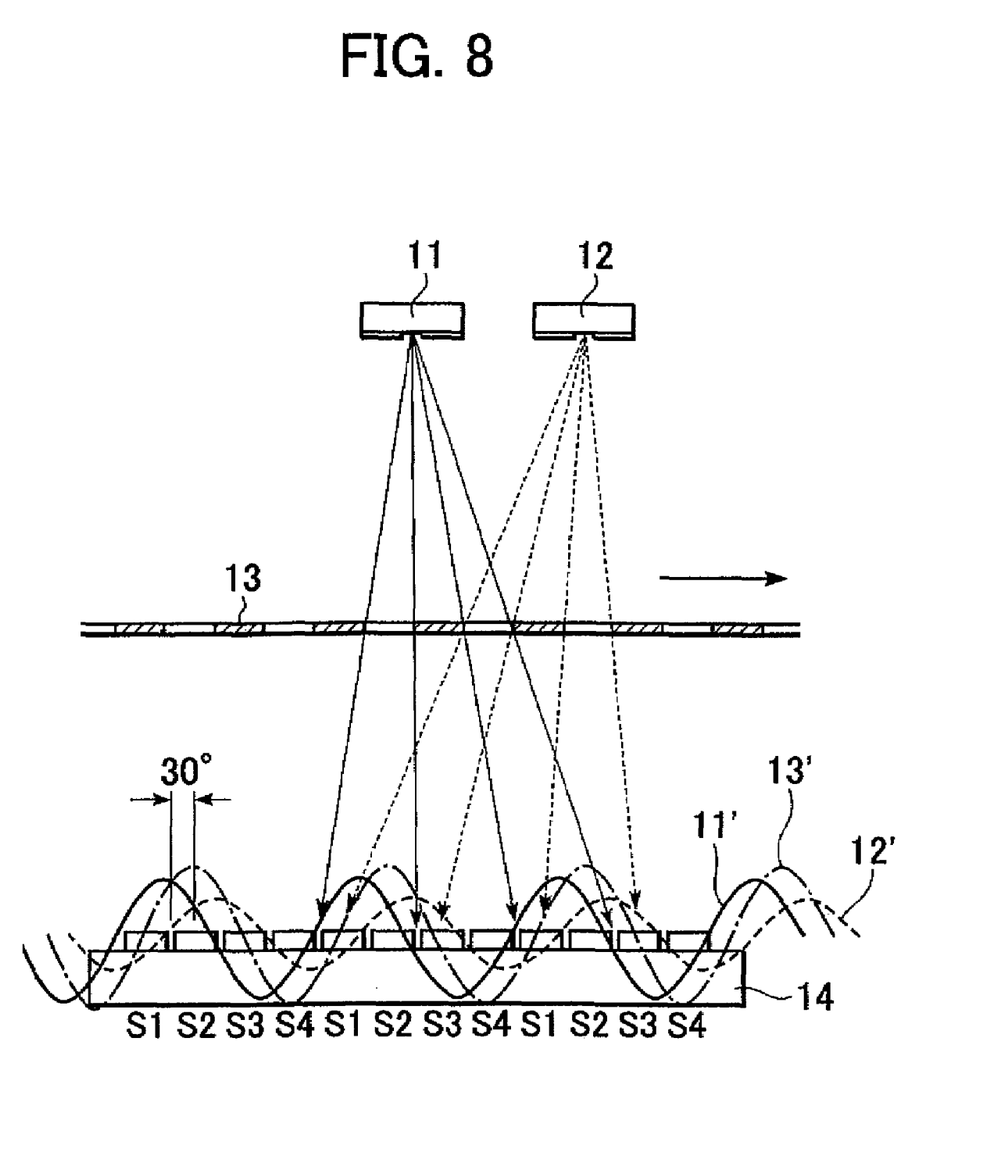
FIG. 8 is a diagram showing a case where the balance of powers of lights emitted by signal light sources is changed.

FIGS. 7 and 8 show the construction of an optical encoder according to a third embodiment. In the first embodiment, the two light-emitting elements 11 and 12 are provided and switched to achieve a resolution that is twice as high compared with the related art. In the third embodiment, light-emitting powers of the two light-emitting elements 11 and 12 are changed and the lights are combined to produce a signal.

Referring to FIG. 7, when the light-emitting element 11 and the light-emitting element 12 are turned on individually, patterns of bright and dark occur at positions shifted by 90° corresponding to one wave cycle on the photoreceptor 14. The bright and dark pattern indicated by 11' is achieved on the photoreceptor 14 when only the light-emitting element 11 is turned on while the light-emitting elements 11 and 12 and the encoder scale 13 are in a certain positional relationship. When the light-emitting element 12 is then switched on, the bright and dark pattern is shifted by 90° on the photoreceptor 14, as indicated by 12'.

When the light-emitting elements 11 and 12 are simultaneously caused to emit light at a power of $1/\sqrt{2}$ compared with the related art, signals output from the processing circuits are combined as indicated by 13'. This is equivalent to the signal in a case where the photoreceptor 14 is shifted by 45° with respect to the light-emitting element 11.

FIG. 8 shows a case where the balance of light-emitting powers of the light-emitting elements 11 and 12 is changed. As shown in FIG. 8, a signal in a case where the photoreceptor 14 is shifted by 30° with respect to the light-emitting element 11 can be obtained by setting a ratio such that the light-emitting power of the light-emitting element 11 is $\cos(30°)=\sqrt{3}/2$ and the light-emitting power of the light-emitting element 12 is $\sin(30°)=1/2$. As for other points, similarly, signals corresponding to shifts in light-emitting position can be obtained by changing the light-emitting powers of the light-emitting elements 11 and 12.

Thus, after the encoder scale 13 is stopped, by changing the balance between the light-emitting elements 11 and 12 as if the device is moving, and finding a point where the digital signal level changes, the stop position can be detected at a desired resolution.

Optical power can be changed by stabilizing optical power while detecting it. Or, the optical power can be controlled based on current values assuming a substantially linear relationship between optical power and current. Although not discussed, optical power may also be changed by using other methods.

Although this embodiment relates to a transmissive optical encoder, the same advantages can be achieved by a reflective optical encoder, with the light-emitting elements and the photoreceptor element disposed on the same side.

According to one aspect of the present invention, by switching between or changing the power of light sources, a resolution much higher than that of a conventional optical encoder can be achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed:

1. An optical encoder comprising:
   a scale having an optical grating;
   a plurality of photoreceptor units each having a same number of photoreceptor elements arranged in a relationship to a pitch of the optical grating to obtain two-phase signals by computing outputs of the photoreceptor units, the photoreceptor units being disposed in a row in a moving direction of the scale;
   a light source having a plurality of light emitting portions which irradiates the photoreceptor elements via the scale from at least two different directions; and
   a controller which changes the light emitting power balance by changing current-balance between the light emitting portions;
   wherein the controller obtains relative-position information between the scale and the photoreceptor units based on the light emitting power balance and on the plurality of two-phase signals obtained respectively in accordance with the changes of light emitting power balance of the light emitting portions.

2. The optical encoder according to claim 1, wherein at least one of the plurality of light emitting portions is selectively caused to emit light, and wherein the relative-position information is obtained based on photoreception signals received by the photoreceptor elements in response to the light emitted.

3. The optical encoder according to claim 1, wherein the light-emitting position of at least one of the plurality of light emitting portions is changed when movement of the scale is stopped, and wherein the relative-position information is obtained from information detected by the photoreceptor elements when the light-emitting position of the at least one of the plurality of light emitting portions is changed.

4. The optical encoder according to claim 1, wherein intensities of lights emitted by the plurality of light emitting portions is changed when movement of the scale is stopped, and the relative-position information is obtained from information detected by the photoreceptor elements when the intensities of lights emitted are changed.

5. The optical encoder according to claim 1 wherein signals having at least two different phases can be obtained by the plurality of photoreceptor elements when the plurality of light emitting portions are switched.

* * * * *